April 8, 1930.                F. W. G. BRUHN                1,753,547
                           POSITIVE SPEED GAUGE
                           Filed Jan. 26, 1927
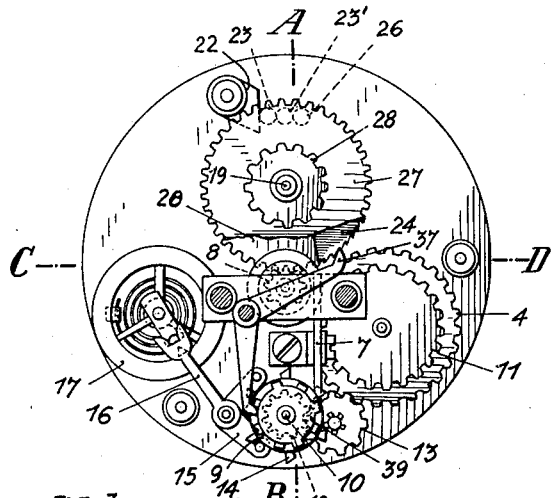
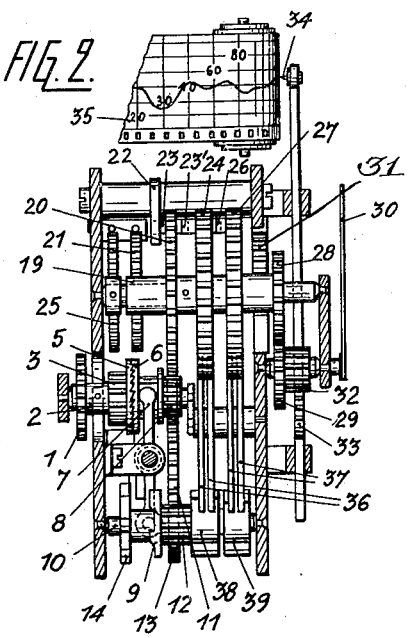
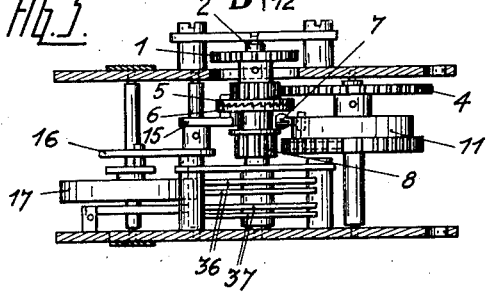
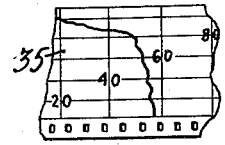
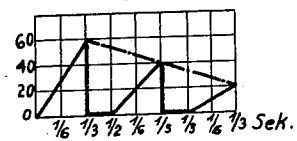
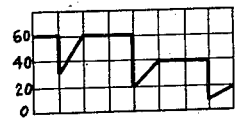
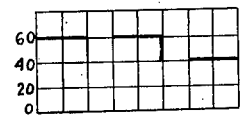
F. W. G. Bruhn
INVENTOR
By: Marks & Clerk
ATTYS.

Patented Apr. 8, 1930

1,753,547

UNITED STATES PATENT OFFICE

FRIEDRICH WILHELM GUSTAV BRUHN, OF BERLIN-WILMERSDORF, GERMANY

POSITIVE SPEED GAUGE

Application filed January 26, 1927, Serial No. 163,793, and in Germany February 15, 1926.

Speed gauges serving for the supervision of the speed of power vehicles, locomotives and the like, also of working machines generally, and provided for that purpose with a recording device recording the consecutive speeds, must be so designed that their indications are correct, and, besides, must be able to follow instantaneously all variations of the speed and record them accordingly. These conditions are particularly important with recording speed gauges of power vehicles as these instruments must be able to answer the highest requirements as to instantaneousness and accuracy of the record.

The first condition, that the indications of the speed gauge be always correct, can be obtained only with a positively operating measuring instrument, because, in the case of a disturbance, it may, indeed, fail but will never show a wrong indication. A great difficulty connected with the building of instruments of this type resides in the necessity to prevent the pointer or the recording stylus from being late with respect to the momentarily occurring variations of the speed. That difficulty increases with the quickness of these variations. A sufficiently quick indicating and recording operation of the instrument can be obtained only by reducing the length of the measuring periods in which the speed existing at the time being is being ascertained by measuring the length of way covered in a certain unit of time (measuring period). This period cannot, however, be reduced at will as the indication or record will become incorrect when a certain limit has been surpassed. On the other hand, it is, in view of the higher costprice of the positively operating speed gauges relatively to the usual non-recording instruments which are cheaper, not feasible to make use of complicated additional devices, such as multiple feed gearings or the like, for the purpose of obviating or overcoming the difficulties mentioned. It is, in fact, desirable to do the reverse, that is to say, to simplify the instrument in order to reduce its cost-price.

Now, my present invention relates to a positive speed gauge which answers these requirements; it works, as is customary with speed gauges of the kind in question with a feed gearing controlled by a wheel-work coupling, in equal periods of time, the driving shaft with, and uncoupling it from, a measuring wheel, the rotatory angular movement of which being transmitted to a pointer released periodically by said wheel-work.

The invention is characterized by the feature that said rotatory angular movement of the measuring wheel is transmitted to the pointer wheel by the intermediary of an adjusting wheel located between said other two wheels and being checked and released alternately by the wheel work in such a manner that the measuring pause lying between two consecutive measuring periods is limited to the interval of time lying between two consecutive checkings. A measuring instrument of this kind permits to shorten said periods in a measure bordering on the limits of technical possibilities, viz to that interval of time lying between two consecutive checkings of the wheel work and being necessary for the return movement of the measuring wheel into its zero position.

The advantages obtained by designing the instrument in this way consist therein that a maximum efficiency never heretofore attained, not even with complicated speed gauges, is obtained with the simplest means in such a manner that not only a nearly uninterrupted, but also an extremely accurate measurement is obtained. The duration of a measuring period is shortened to one half of a second, in such a manner, that two thirds of this time, i. e. $\frac{1}{3}$ of a second, are used as measuring period proper, that is to say, for coupling the measuring wheel with the driving shaft, so that only $\frac{1}{6}$ of a second is required for the measuring pause.

This reduction of the measuring period to the minimum of $\frac{1}{2}$ of a second is important not only as regards the considerably quicker speed measurement, but also, and especially, as regards the recording, in that quickly proceeding actions, especially a sudden increase of the speed, or quick braking in order to prevent a collision or an accident, can be examined very accurately with the aid of small, but distinctly visible time marks. This manner of controlling the speed is applicable especially in such cases where, as is preferable, only the course of the speed on the last portion of the drive, for instance on the last 10 kilometers or less, can be read on the record, whereas the preceding portions of the drive are continuously erased.

A constructional form of the improved speed gauge is illustrated by way of example on the accompanying drawing in which Figure 1 shows a front view of the mechanism, the front wall thereof being removed; Figure 2 a vertical section in the plane A—B of Fig. 1; Figure 3 a horizontal section in the plane C—D of Fig. 1; Figure 4 three graphical representations of the feed actions; and Figure 5 a piece of the recording strip with the appertaining braking curve.

The shaft 2 which is rotated by any driving means (not shown) by the intermediary of the cog-wheel 1 carries, besides a cog-wheel 3 serving to transmit the rotation to the winding-up wheel 4 for the driving spring of the wheel-work controlling the feed actions, a fine-toothed crown wheel 5 with which another crown wheel 6 supported loosely upon the shaft 2 and being shiftable thereon can be brought into mesh temporarily. This temporary coupling of the wheels 5 and 6 with each other is effected by means of the double-armed lever 7 which is subjected to the influence of a spring and is controlled by the cam disk 9. This disk is affixed to the shaft 10 which is turned by the spring casing 11, that is wound up continuously and automatically and provided with a dragspring, by the intermediary of the wheel 13 which meshes with the wheel 12, the driving gear formed by these members being regulated by a checking gear composed of the check wheel 14, the anchor 15, the anchor fork 16, and the balance wheel 17. The shaft 10 which, therefore, rotates with uniform speed moves, by the intermediary of the lever 7, the coupling disk alternately into and out of, mesh with the counter coupling disk 5, the manner of operation being such that said disk 6 is coupled for ⅓ of a second with the driving gear of the respective vehicle or machine, or with the shaft 2 respectively, and is then uncoupled for ⅙ of a second. The rotary motion transmitted to the coupling disk 6 during the coupling period (measuring period) is transmitted further by the cog-wheel 8 which is connected with said disk 6 to the measuring wheel 20 which is supported loosely upon the shaft 19 and is moved back into its initial position, after every uncoupling, by a spring 21, moving said wheel 20 against an abutment member 22.

The pin 23 of the measuring wheel 20 extends through to the other side and turns, while this wheel is running forward, and counter to the action of a spring 25, the adjusting wheel 24 in that the pin 23 contacts with the throughgoing cross-pin 23' of the adjusting wheel 24. This wheel transmits by its catch-pin 23' the rotatory motion transmitted to it by the adjusting wheel 20 further to the pointer wheel 27 also supported loosely upon the shaft 19; the hub 26 of this wheel is connected positively with the pointer 30 by the wheels 28 and 29. A spring 31 tends to turn the pointer wheel and the pointer back into its former position. The pointer is connected by the intermediary of the pinion 32 with a rack 33 provided with a writing pen 34 for recording the speed upon a paper strip 35 or the like.

The adjusting wheel 24 and the pointer wheel 27 have fine ratchet teeth engaged by pawls 36 and 37 under the pressure of suitably disposed springs. The lower arm of every pawl bears upon a cam disk (38 and 39) by which the respective pawl is made to engage, and is disengaged from, the respective wheel (24 and 27). How this is performed appears from the graphic representation of the feed in Fig. 4, in which I shows the control of the measuring wheel, II the control of the adjusting wheel, and III the control of the pointer wheel.

The measuring action proceeds as follows: While the measuring wheel 20 is running (being coupled with the driving shaft 2), the adjusting wheel 24 is released for the backward movement by the pawls 36 that are controlled by the cam 38. The adjusting wheel 24 is rotated backwardly by the spring 25 until its abutment pin 23' contacts with the catch pin 23 of the measuring wheel 20. From this moment the adjusting wheel is again turned in forward direction until the wheel 6 is uncoupled from the wheel 5 and the measuring wheel 20 has thereby been released so that it can turn back into its initial position. The adjusting wheel 24, being checked by its pawls 36, remains in that position it has received by the measuring wheel 20. Immediately thereafter the pointer wheel is released by the release of the pawls 37 by the cam disk 39, and can now turn back to the pin 23' of the adjusting wheel 24 if the speed should have become less during the last measuring period. If the speed has not changed, the pointer wheel 27 remains in its position and is checked therein again after ⅙ of a second. If, however, the speed has increased, the pin 23' carries the pointer wheel with it by the intermediary of the pin 26 and in correspondence with the greater speed, said wheel being then checked by its pawls 37 in that position which corresponds to the respective increased speed and in which this speed is indicated by the pointer arm 30.

The brake curve illustrated in Fig. 5 shows distinctly in which simple and lucid manner the marking of the periods of time is effected by the curve itself. The changes of the speed are marked from step to step in fractions of seconds, and are distinctly readable and to be enumerated as such. As the steps are separated from each other only by ½ of a second a distinct subsequent survey of the braking action, or, more generally, of the variations of the speed, is rendered possible.

Claim:

In a positively operated speed measuring device, the combination with a driving means for such mechanism, of clockworks, a clutch in said driving means, means operable by said clockworks to engage and release said clutch at equal intervals of time, a measuring wheel driven by said clutch and in directly toothed engagement with said clutch, an adjusting wheel, an indicating wheel, all of said wheels located directly adjacent on the same axis, spring means normally tending to return said driving, adjusting and indicating wheels to zero position respectively, a fixed positioning contact for said measuring wheel, driving contact members between said measuring and adjusting wheels and between said adjusting and indicating wheels, ratchet mechanism engaging the adjusting and indicating wheels controlled by the clockworks to stop and release said adjusting and indicating wheels respectively and recording and indicating means operated by said indicating wheels.

In testimony whereof I affix my signature.

FRIEDRICH WILHELM GUSTAV BRUHN.